United States Patent
Nakamura et al.

(10) Patent No.: US 7,458,455 B2
(45) Date of Patent: Dec. 2, 2008

(54) CONVEYING APPARATUS WITH LIFTING/LOWERING TO-BE-CONVEYED OBJECT SUPPORT TABLE

(75) Inventors: Jirou Nakamura, Osaka (JP); Nobuhiro Hayashi, Shiga (JP); Masanobu Satou, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 11/631,834

(22) PCT Filed: Aug. 2, 2005

(86) PCT No.: PCT/JP2005/014084

§ 371 (c)(1),
(2), (4) Date: Jan. 5, 2007

(87) PCT Pub. No.: WO2006/016502

PCT Pub. Date: Feb. 16, 2006

(65) Prior Publication Data
US 2008/0029366 A1 Feb. 7, 2008

(30) Foreign Application Priority Data
Aug. 9, 2004 (JP) .............................. 2004-232023
Aug. 9, 2004 (JP) .............................. 2004-232024

(51) Int. Cl.
B65G 13/12 (2006.01)
B65G 17/48 (2006.01)
B61D 47/00 (2006.01)

(52) U.S. Cl. .................... 198/463.3; 198/346.1; 29/824
(58) Field of Classification Search ............. 198/463.3, 198/468.6, 346.1, 346.3; 29/824
See application file for complete search history.

(56) References Cited

U.S. PATENT DOCUMENTS

| | | | | |
|---|---|---|---|---|
| 2,857,036 A | * | 10/1958 | Leiser | .......................... 198/721 |
| 4,646,915 A | * | 3/1987 | Ohtaki et al. | ............. 198/346.2 |
| 4,924,996 A | * | 5/1990 | Svensson et al. | ........ 198/341.05 |
| 6,308,404 B1 | * | 10/2001 | Hirschmann et al. | ........... 29/822 |
| 7,077,620 B2 | * | 7/2006 | Ishioka | ..................... 414/749.1 |
| 7,178,660 B2 | * | 2/2007 | Dehne et al. | ............... 198/463.1 |

FOREIGN PATENT DOCUMENTS

JP H07-172538 7/1995

* cited by examiner

*Primary Examiner*—Mark A Deuble
(74) *Attorney, Agent, or Firm*—Schweitzer Cornman Gross & Bondell LLP (57) ABSTRACT

A conveying apparatus formed so as to selectively move a to-be-conveyed object support table (3) installed on a conveying traveler body (1) to a lifted position by pushing up the support table by cam rails (40) laid down in the specific section of a conveying route, wherein the holding function of the to-be-conveyed object support table (3) at the lifted position is increased to enhance safety. A to-be-latched portion (33) reciprocatingly moving in a roughly horizontal direction according to a standing/falling motion of the crosslink mechanisms (12) and latches (34) for locking automatically engaged with the to-be-latched portion (33) when the to-be-conveyed object support table (3) is lifted to a predetermined position are installed on the conveying traveler body (1) sides of the crosslink mechanisms (12) liftably supporting the to-be-conveyed object support table (3). Unlocking cams (41) switching the latches (34) for locking to a lock release attitude according to the traveling of the conveying traveler body (1) are installed on the cam rails at an end portion of the specific section.

6 Claims, 8 Drawing Sheets

CONVEYING APPARATUS WITH LIFTING/LOWERING TO-BE-CONVEYED OBJECT SUPPORT TABLE

FIELD OF THE INVENTION

The present invention relates to a conveying apparatus formed so as to selectively move a to-be-conveyed object support table provided so as to be liftable and lowerable on a conveying traveler body such as a carriage to a lifted position by a cam rail provided on the side of a conveying route.

DESCRIPTION OF THE PRIOR ART

For this type of conveying apparatus, as described in Patent Literature 1, a to-be-conveyed object support table is supported on a conveying traveler body so as to be freely liftable and lowerable via a freely erectable crosslink mechanism, and in a specific section of a conveying route, cam rails that selectively move the to-be-conveyed object support table to a lifted position by working on a to-be-operated portion provided in the crosslink mechanism so as to raise the crosslink mechanism are disposed.

Patent Literature 1: Japanese Published Unexamined Patent Application No. H07-172538

Therefore, conventionally, according to the configuration of this type of conveying apparatus, if the to-be-operated portion provided in the crosslink mechanism is composed of a lifting/lowering rod to thrust up the crosslink as described in, for example, Patent Literature 1, when an accident such that the to-be-operated portion (lifting/lowering rod) is broken owing to a material deterioration of the to-be-operated portion (lifting/lowering rod) or overloading of a to-be-conveyed object occurs, the to-be-conveyed object support table that has been held at the lifted position by the to-be-operated portion (lifting/lowering rod) and cam rails falls down to a lowering limit position by gravity with impact, and this may lead to a fatal accident resulting in injury or death.

SUMMARY OF THE INVENTION

It is an object of the present invention to provide a conveying apparatus that can eliminate conventional problems as described above, and means therefore will be shown with reference numerals in embodiments to be described later denoted in parentheses. In a conveying apparatus in which a to-be-conveyed object support table (3) is supported on a conveying traveler body (1) so as to be freely liftable and lowerable via a freely erectable crosslink mechanism (12), and a cam rail (40) that selectively moves the to-be-conveyed object support table (3) to a lifted position by working on a to-be-operated portion (14) provided in the crosslink mechanism (12) so as to raise the crosslink mechanism (12) is disposed in a specific section of a conveying route, on a side of the conveying traveler body (1) of the crosslink mechanism (12), a to-be-latched portion (33) that reciprocatingly moves in a roughly horizontal direction as a result of a standing/falling motion of the crosslink mechanism (12) is provided, a locking latch (34) that is automatically latched with the to-be-latched portion (33) when the to-be-conveyed object support table (3) has been lifted to a predetermined position is provided, and, at an end portion of the specific section, an unlocking cam (41) that switches the locking latch (34) to an unlocking posture as a result of traveling of the conveying traveler body (1) is provided.

With regard to carrying out the present invention with the above-described configuration, concretely, as in a second aspect of the invention, when the crosslink mechanism (12) includes two crosslinks (13a and 13b) provided side by side and being in conjunction with each other, the to-be-latched portion (33) can be composed of a slide fulcrum shaft (25) on the conveying traveler body (1) side hung between the two crosslinks (13a and 13b).

In addition, as in a third aspect of the invention, when a plurality of specific sections that are different in height of lifted positions of the to-be-conveyed object support table (3) are provided, and in the locking latch (34), a plurality of latching portions (34b and 34c) can be provided in a manner corresponding to the lifted positions of the to-be-conveyed object support table (3) in the respective specific sections. The configuration according to the third aspect of the invention can be carried out in combination with the configuration according to either the first or second aspect of the invention.

Although the to-be-operated portion (14) provided in the crosslink mechanism (12) may be of any configuration, however, particularly, as in a fourth aspect of the invention, when the links (15a and 15b) of the crosslink mechanism (12) are disposed in a direction parallel to a traveling direction of the conveying traveler body (1), of the links (15a and 15b), on the link (15a) provided with a position fixing fulcrum shaft (19) on the conveying traveler body (1) side, a cam follower roller (31) can be supported about an axis so as to protrude to a downside of the conveying traveler body (1) at a position close to the position fixing fulcrum shaft (19), and the to-be-operated portion (14) can be composed of the cam follower roller (31). The configuration according to the fourth aspect of the invention can be carried out in combination with the configuration according to any one of the first to third aspects of the invention.

Moreover, when the configuration according to the fourth aspect of the invention is employed and, as in a fifth aspect of the invention, when the crosslink mechanism (12) includes a pair of right and left crosslinks (13a and 13b) being in conjunction with each other, of the links (15a and 15b) provided two each to compose both these links (13a and 13b), the links (15a) provided with position fixing fulcrum shafts (19) on the conveying traveler body (1) side can be coupled to each other by a coupling member (28) at a position close to the position fixing fulcrum shafts (19), and the cam follower roller (31) can be supported about an axis below the coupling member (28).

Furthermore, when the configuration according to the fourth and fifth aspects of the invention is employed, as in a sixth aspect of the invention, it is desirable that the links (15a and 15b) of the crosslink mechanism (12) are disposed in a direction where position fixing fulcrum shafts (19 and 24) at one end are located forward in the traveling direction of the conveying traveler body (1) relative to slide fulcrum shafts (20 and 25) at the other end.

By a conveying apparatus according to the present invention with the above-described configuration, even when a situation such that the to-be-operated portion on the crosslink mechanism side is broken occurs, the locking latches that have been automatically latched with the to-be-latched portions on the crosslink mechanism side prevents a falling motion of the crosslink mechanism, that is, a lowering motion of the to-be-conveyed object support table, so that a fatal accident caused by the to-be-conveyed object support table falling down with impact can be avoided, and safety can be improved. Moreover, an actuator that requires a special operation or power supply for locking the crosslink mechanism in a standing condition at the start portion of a specific section (locking the to-be-conveyed object support table at a lifted position) and unlocking the locked condition at the end portion of the specific section is unnecessary, so that the invention can be easily carried out without involving an inconvenience to lower workability or a substantial rise in cost.

The to-be-latched portions can also be provided in the crosslinks at positions close to the slide fulcrum shaft on the conveying traveler body side. In this case, however, the to-be-latched portions also slightly move up and down as a result of a standing/falling motion of the crosslink mechanism. Accordingly, it is desirable to provide the to-be-latched portions concentrically with a slide fulcrum on the conveying traveler body side of the crosslink mechanism, however, particularly, when the crosslink mechanism includes two crosslinks provided side by side and being in conjunction with each other, according to the second aspect of the invention, the slide fulcrum shaft on the conveying traveler body side hung between the two crosslinks can be used also as the to-be-latched portions, so that the invention can be carried out at a low cost with a simplified structure. Moreover, since the slide fulcrum shaft does not involve an up-and-down motion, an automatic latching motion of the locking latches can also be reliably carried out.

Moreover, by the configuration according to the third aspect of the invention, the to-be-conveyed object support table can be locked at a plurality of lifted positions different in height by using one locking latch, so that the invention can be carried out at a lower cost with a more simple structure than when a plurality of locking latches and unlocking cams corresponding to the respective locking latches are provided in a manner corresponding to the respective lifted positions.

Furthermore, by the configuration according to the fourth aspect of the invention, the to-be-operated portion working on the cam rail on the conveying route side is composed of the cam follower roller supported about an axis on the links of the crosslink mechanism, and via the cam follower roller, the links of the crosslink mechanism are directly pushed up by the cam rail so as to carry out a standing motion. Therefore, even when the slope of a to-be-operated portion (cam follower roller) pushing-up action portion of the cam rail is increased so as to reduce a traveling distance of the conveying traveler body required for pushing up the to-be-conveyed object support table to the lifted position, the crosslink mechanism can be made to carry out a standing motion more smoothly with less difficulty than when a conventional lifting/lowering rod is vertically pushed up. In other words, the slope of the to-be-operated portion pushing-up action portion of the cam rail can be increased to improve use efficiency of the conveying route. In addition, since there is no such lifting/lowering rod, as in the conventional art, that is likely to be broken by buckling, the invention can also be easily carried out as a conveying apparatus that handles a major load. As a matter of course, in the structure, the lifting/lowering rod, the lifting/lowering guide means thereof, the mechanism that converts a lifting motion of the lifting/lowering rod to a swinging motion of the links of the crosslink mechanism, and the like are no longer necessary, so that the invention can be carried out at a low cost with a smaller number of components.

When the crosslink mechanism includes a pair of right and left crosslinks being in conjunction with each other, by the configuration according to the fifth aspect of the invention, in comparison with when cam follower rollers are provided for the pair of right and left crosslinks, respectively, only one cam follower roller and one cam rail are necessary, so that the invention can be carried out at a low cost with a simple structure, and both crosslinks can be made to carry out a standing/falling motion in a manner reliably synchronized by the cam rail on the conveying route side.

In addition, by the configuration according to the sixth aspect of the invention, when the links of the crosslink mechanism are disposed in a direction where position fixing fulcrum shafts at one end are located rearward in the traveling direction of the conveying traveler body relative to slide fulcrum shafts at the other end, the to-be-operated portion (cam follower roller) by the cam rail can be made closer to the position fixing fulcrum shafts of the links. In other words, the to-be-operated portion (cam follower roller) by the cam rail can be arranged close to the position fixing fulcrum shafts of the links to increase the height of the lifted position of the to-be-conveyed object support table while reducing the pushing-up amount (cam rail height) of the to-be-operated portion (cam follower roller) by the cam rail, so that the conveying traveler body can be provided as a low-floor structure.

DESCRIPTION OF THE PREFERRED EMBODIMENTS

Figure 1:
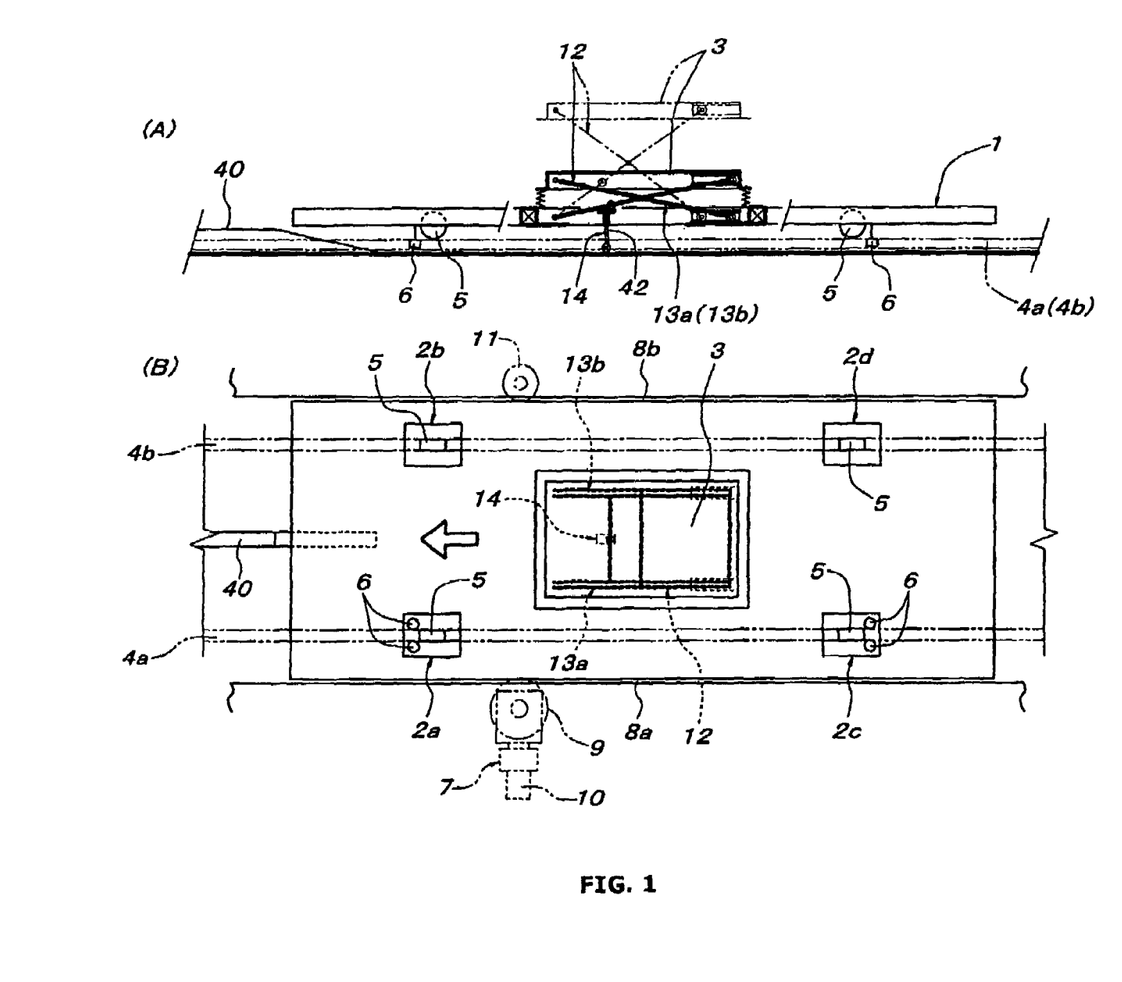
FIG. 1A is a partially longitudinally sectional schematic side view exemplifying a basic configuration of a carriage-type conveying apparatus.
FIG. 1B is a schematic plan view of the same.

Hereinafter, detailed embodiments of the present invention will be described based on the accompanying drawings. FIG. 1 exemplify a basic configuration of a friction-drive carriage type conveying apparatus with a freely liftable and lowerable to-be-conveyed object support table. Reference numeral 1 denotes a conveying traveler body that is long in a traveling direction and is rectangular in a plane, which is equipped with two front and rear sets of right and left pairs of wheel units 2a to 2d and a freely liftable and lowerable to-be-conveyed object support table 3. The respective wheel units 2a and 2d have wheels 5 that roll on a pair of right and left guide rails 4a and 4b laid down along a conveying route, and in the two front and rear wheel units 2a and 2c on one of the right and left sides (in the illustrated example, left side), anti-vibration vertical axis rollers 6 that sandwich the guide rail 4a from both right and left sides are provided. The conveying traveler body 1 is propelled by a friction drive means 7 concurrently provided at an appropriate point of the conveying route. The friction drive means 7 is conventionally well known and composed of a drive friction wheel 9 that abuts against one friction surface 8a of a pair of right and left mutually parallel vertical friction surfaces 8a and 8b formed on the conveying traveler body 1 so as to continue across the overall length thereof, a motor 10 for rotary drive of the drive friction wheel 9, and a backup roller 11 that abuts against the other friction surface 8b so as to sandwich the conveying traveler body 1 between the same and drive friction wheel 9.

Although the friction drive means 7 has been exemplified as a means for propelling the conveying traveler body 1, a propelling means by any other method may be employed, such as driving at least one of the wheels 5 by a motor, or engaging a drive chain provided in a tensioned state so as to move along the conveying route of the conveying traveler body 1 with the conveying traveler body 1 and propelling the conveying traveler body 1 by the drive chain. In addition, for the vertical friction surfaces 8a and 8b that are necessary in the conveying traveler body 1 when the friction drive means 7 is used, both right and left side surfaces may be diverted as they are or other members may be attached. Furthermore, although individually independent carriages have been used as the conveying traveler bodies 1, the conveying device may be one in which to-be-conveyed object support tables 3 are disposed at appropriate intervals on a conveying object traveler body that continues in the conveying route direction, as in a slat conveyer.

The to-be-conveyed object support table 3 is supported so as to be vertically liftable and lowerable by a crosslink mechanism 12 interposed, under the to-be-conveyed object support table 3, between the same and conveying traveler body 1. This crosslink mechanism 12 includes a pair of right and left crosslinks 13a and 13b and a to-be-operated portion 14. In a specific section of the conveying route of the conveying traveler body 1, that is, a specific section where the to-be-conveyed object support table 3 is kept lifted at a lifted position, a cam rail 40 that works on the to-be-operated portion 14 of the crosslink mechanism 12 so as to make the crosslink mechanism 12 stand up and thereby raises the to-be-conveyed object support table 3 to a lifted position is laid down.

Figure 2:
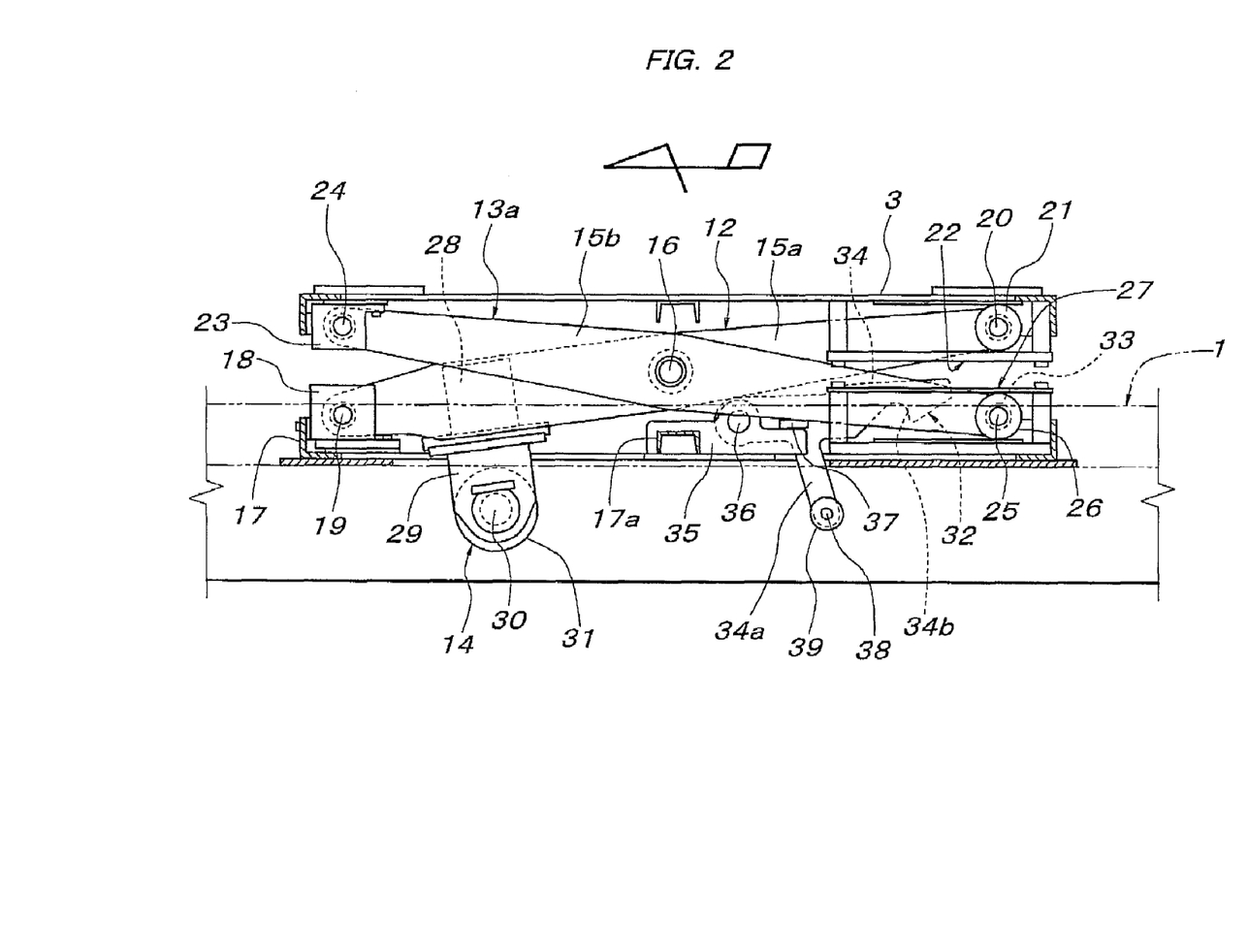
FIG. 2 is a longitudinally sectional side view showing a crosslink mechanism with a locking means according to the present invention.
Figure 3:
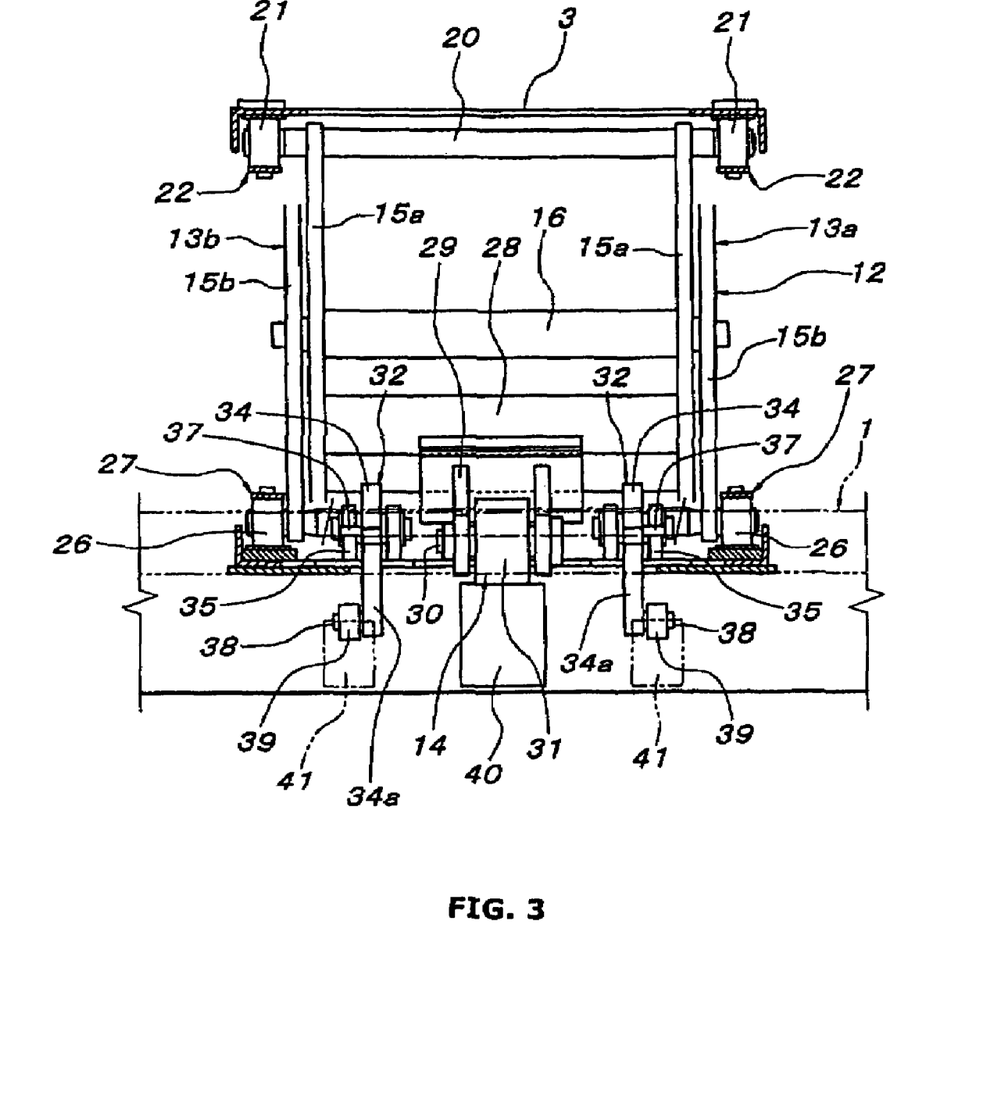
FIG. 3 is a longitudinally sectional rear view showing the same crosslink mechanism made to stand up by a cam rail.
Figure 4:
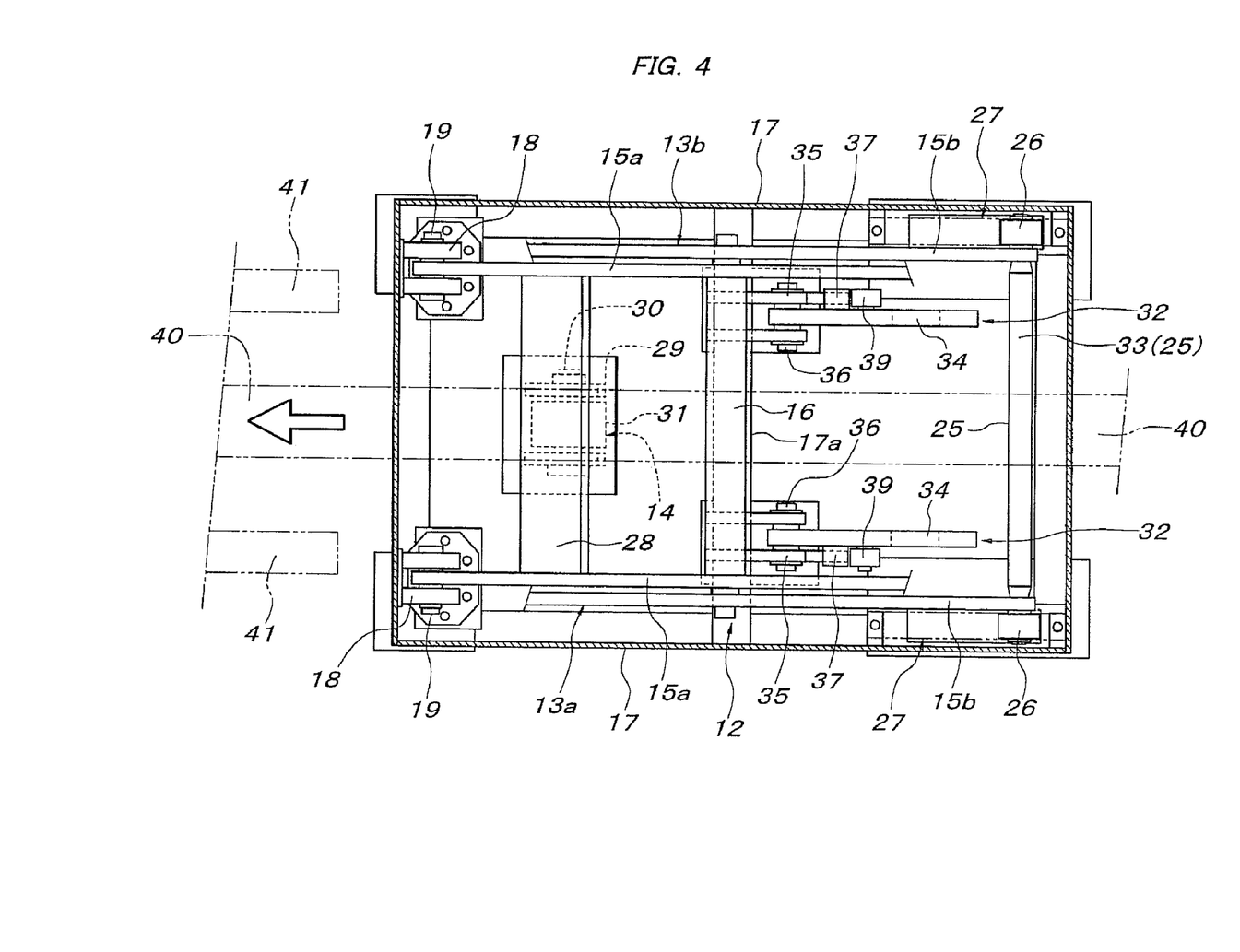
FIG. 4 is a cross-sectional plan view of the same crosslink mechanism in a fallen condition.

FIG. 2 to FIG. 4 show an embodiment of the crosslink mechanism 12 configured based on the present invention. The pair of right and left crosslinks 13a and 13b included in the crosslink mechanism 12 are formed of two pairs of links 15a and 15b whose center crossover portions are pivotally mounted at both end portions of a common center fulcrum shaft 16 in the right and left horizontal direction, and of the links 15a and 15b provided two each, front end portions of both links 15a to be located inside are pivotally mounted so as to be freely swingable up and down by mutually concentric position fixing fulcrum shafts 19 in the right and left horizontal direction on a pair of right and left bearing members 18 provided at both right and left sides of the upside of a front end portion of a plane-rectangular frame 17 on the conveying traveler body 1 side. Rear end portions of both links 15a are coupled by a common slide fulcrum shaft 20 in the right and left horizontal direction, and rollers 21 removably supported on both ends of the common slide fulcrum shaft 20 are fitted with back-and-forth slide guides 22 provided at both right and left sides of the downside of a rear end portion of the to-be-conveyed object support table 3 so as to be rollable in the back and forth direction. Of the links 15a and 15b provided two each, front end portions of both links 15b to be located outside are pivotally mounted so as to be freely swingable up and down by mutually concentric position fixing fulcrum shafts 24 in the right and left horizontal direction on a pair of right and left bearing members 23 provided at both right and left sides of the downside of a front end portion of the to-be-conveyed object support table 3. Rear end portions of both links 15b are coupled by a common slide fulcrum shaft 25 in the right and left horizontal direction, and rollers 26 removably supported on both ends of the common slide fulcrum shaft 25 are fitted with back-and-forth slide guides 27 provided at both right and left sides of the upside of a rear end portion of the plane-rectangular frame 17 so as to be rollable in the back and forth direction.

The to-be-operated portion 14 of the crosslink mechanism 12 shown in FIG. 2 and FIG. 4 is composed of a cam follower roller 31 removably supported via a bearing member 29 and a spindle 30 in the right and left horizontal direction below a center portion of a coupling member 28 in the right and left horizontal direction that couples and integrates, of links 15a and 15b provided two each to compose the pair of right and left crosslinks 13a and 13b, both links 15a with each other at a position in the vicinity of the front end portions of both links 15a to be inside. The cam follower roller 31 is protruded downward further than the bottom surface of the conveying traveler body 1 when the to-be-conveyed object support table 3 is located at a lowering limit position as shown in FIG. 2.

Moreover, in the crosslink mechanism 12, a locking means 32 that locks the to-be-conveyed object support table 3 at a lifted position is concurrently provided. The locking means 32 includes a pair of right and left latches 34 that use, as to-be-latched portions 33, the common slide fulcrum shaft 25 hung between the rear end portions of both links 15b to be outside of the links 15a and 15b provided two each to compose the pair of right and left crosslinks 13a and 13b and are automatically latched with the to-be-latched portions 33. The respective latches 34 are, as shown in FIG. 3 and FIG. 4, arranged with respect to the cam follower roller 31 of the to-be-operated portion 14 in a condition separated to the right and left, are supported about an axis so as to be freely swingable up and down by mutually concentric spindles 36 in the right and left horizontal direction on two right and left sets of bearing members 35 disposed by use of a reinforcement 17a hung in the right and left horizontal direction at a middle position in the back-and-forth direction of the plane-rectangular frame 17 of the conveying traveler 1 side, and are held by gravity at home positions where abutting members 37 provided as annexes to the respective latches 34 are caught by the bearing members 35. Moreover, in the respective latch 34, arm portions 34a are integrally provided downward in connected row arrangements, and on the lower ends of the arm portions 34a, cam follower rollers 39 are removably supported via mutually concentric spindles 38 in the right and left horizontal direction. The cam follower rollers 39 are protruded downward further than the bottom surface of the conveying traveler body 1.

The to-be-conveyed object support table 3 is normally stable in a condition lowered to a lowering limit position shown in FIG. 2. At this time, the lowering limit position of the to-be-conveyed object support table 3 is determined by a height-adjustable support tool (which is conventionally well known, and illustration is omitted) provided in a standing condition on the conveying traveler body 1 side. When the to-be-conveyed object support table 3 is located at a lowering limit position as such, the pair of right and left crosslinks 13a and 13b of the crosslink mechanism 12 are in a fallen condition as shown in FIG. 2, and the cam follower roller 31 of the to-be-operated portion 14 is protruded from the bottom surface of the conveying traveler body 1 at the maximum.

Figure 5:
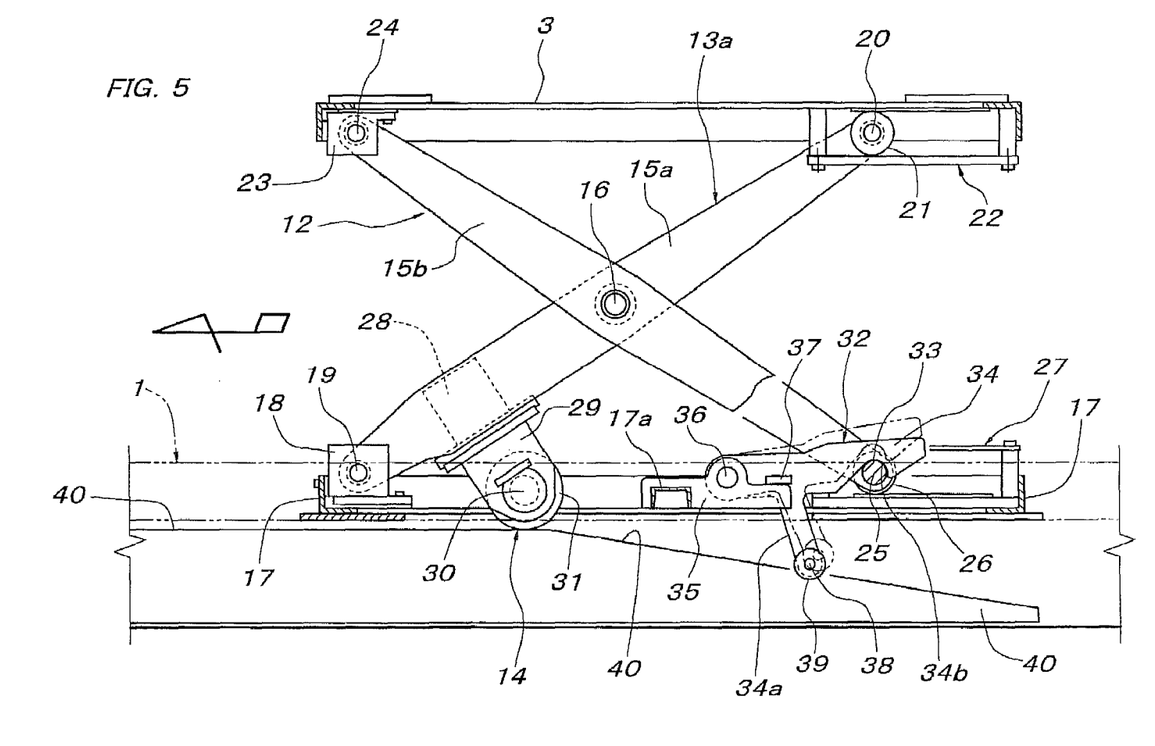
FIG. 5 is a longitudinal sectional side view showing the same crosslink mechanism made to stand up by a cam rail.

Therefore, when the traveling conveying traveler body 1 enters a specific section where the to-be-conveyed object support table 3 is kept lifted at a lifted position, the cam follower roller 31 of the to-be-operated portion 14 gradually rides on the cam rail 40 as shown in FIG. 5, and the cam rail 40 thrusts up the inside links 15a of the pair of right and left crosslinks 13a and 13b via the cam follower roller 31 of the to-be-operated portion 14 and coupling member 28. Accordingly, the pair of right and left crosslinks 13a and 13b carry out a standing motion in conjunction with each other, so that the to-be-conveyed object support table 3 supported by the pair of right and left crosslinks 13a and 13b rises while maintaining a horizontal posture. At this time, the upper and lower common slide fulcrum shafts 20 and 25 of the pair of right and left crosslinks 13a and 13b are to slide horizontally forward via the rollers 21 and 26 and the slide guides 22 and 27, however, the lower common slide fulcrum shaft 25 (to-be-latched portions 33) passes while pushing up the pair of right and left latches 34 via inclined surfaces on the downside of the front ends thereof immediately before the to-be-conveyed object support table 3 reaches the lifted position, and when the to-be-conveyed object support table 3 has reached the lifted position, that is, when the cam follower roller 31 of the to-be-operated portion 14 has reached a highest flat surface of the cam rail 40, concave latching portions 34b of the pair of right and left latches 34 are fitted and latched with the lower common slide fulcrum shaft 25 (to-be-latched portions 33) from upside by gravity. As a matter of course, springs that forcedly charge the respective latches 34 downward may be used together.

As described above, when the conveying traveler body 1 enters a specific section, the conveying object support table 3 that has been located at a lowering limit position is lifted to the lifted position by the operation of the cam rail 40 and crosslink mechanism 12. At this time, the latches 34 of the locking means 32 are automatically latched with the to-be-latched portions 33 (lower common slide fulcrum shaft 25) of the crosslink mechanism 12 so as to prevent the pair of right and left crosslinks 13a and 13b in a standing condition from carrying out a falling motion. Namely, the concave latching portions 34b of both latches 34 fitted with the common slide fulcrum shaft 25 (to-be-latched portions 33) prevents a rearward slide of the common slide fulcrum shaft 25 (to-be-latched portions 33) of the crosslinks 13a a and 13b in a standing condition when the to-be-conveyed object support table 3 is lowered from the lifted position. Therefore, even if the to-be-operated portion 14 (cam follower roller 31) that has been pushed up by the cam rail 40 is broken for some reason during the time the conveying traveler body 1 is traveling in the specific section where the to-be-conveyed object support table 3 is kept lifted at the lifted position and the thrusting effect of the cam rail 40 against the crosslinks 13a and 13b is consequently lost, in other words, even if there is no cam rail 40 between a start portion and an end portion of the specific section, the to-be-conveyed object support table 3 can be reliably held at the lifted position.

Figure 6:
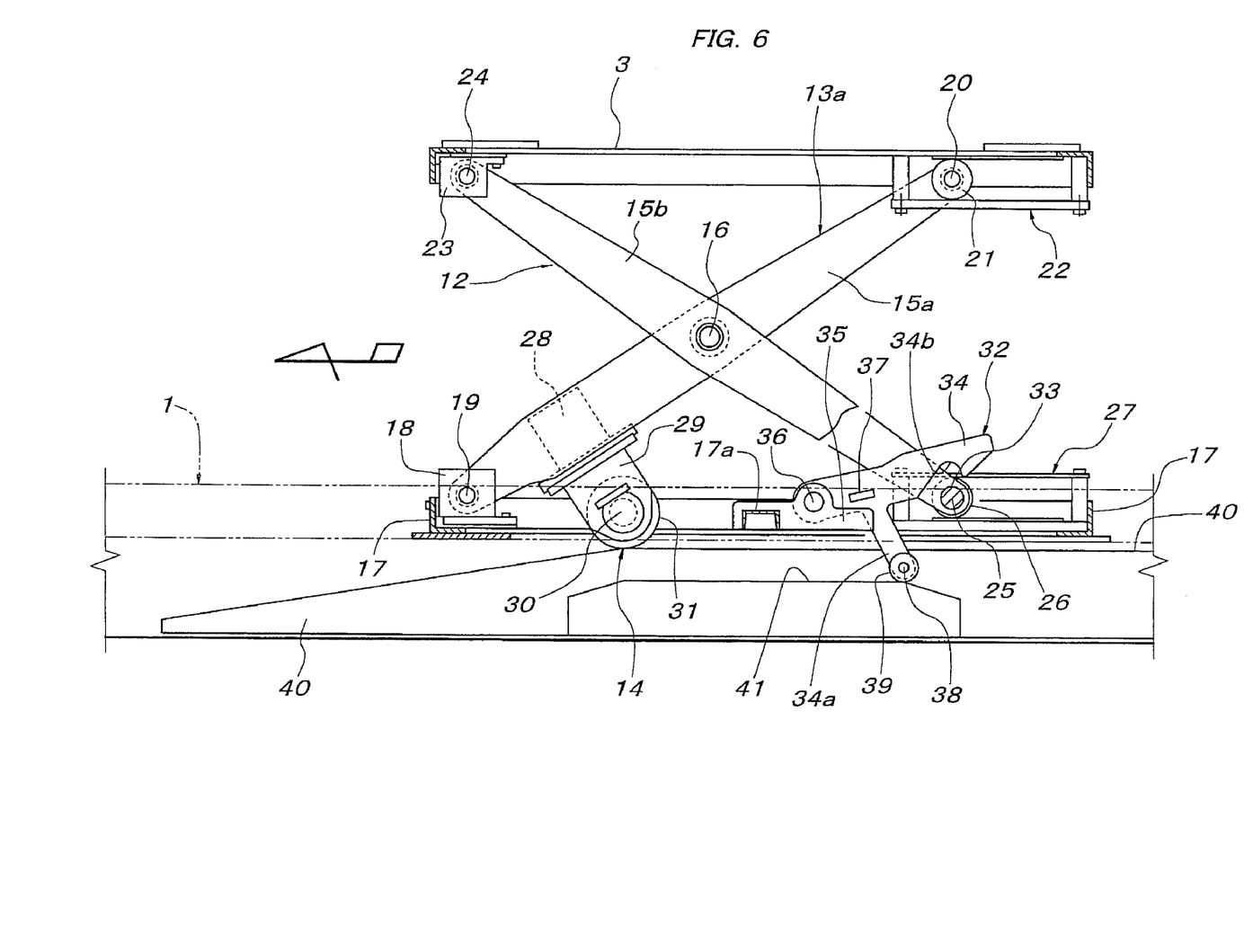
FIG. 6 is a longitudinal sectional side view showing the locking mechanism of the same crosslink mechanism being unlocked.

At the end portion of the specific section where the to-be-conveyed object support table 3 is kept lifted at the lifted position, unlocking cams 41 are laid on the conveying route side of the conveying traveler body 1 as shown in FIG. 6. The unlocking cams 41 are arranged on both right and left sides of the cam rail 40 in a manner corresponding to the respective latches 34 so that the cam follower rollers 39 of the latches 34 ride thereon as the conveying traveler 1 travels, and the length and position are set so that the cam follower rollers 39 ride on the unlocking cams 41 so as to swing the latches 34 upward against gravity, the concave latching portions 34b of the latches 34 are separated upward from the common slide fulcrum shaft 25 (to-be-latched portions 33) on the crosslink mechanism 12 side, and then the cam follower roller 31 being the to-be-operated portion 14 of the crosslink mechanism 12 descends down an end downhill slope portion of the cam rail 40, the crosslinks 13a and 13b carry out a falling motion, and the common slide fulcrum shaft 25 (to-be-latched portions 33) leaves rearward from the position directly below the concave latching portions 34b of the latches 34. Therefore, at the end portion of the specific position, after the locking effect of the locking means 32 at the lifted position of the to-be-conveyed object support table 3 is automatically released, the to-be-conveyed object support table 3 that has been held at the lifted position is lowered to a lowering limit position by an effect of the cam rail 40 with the crosslink mechanism 12.

Figure 7:
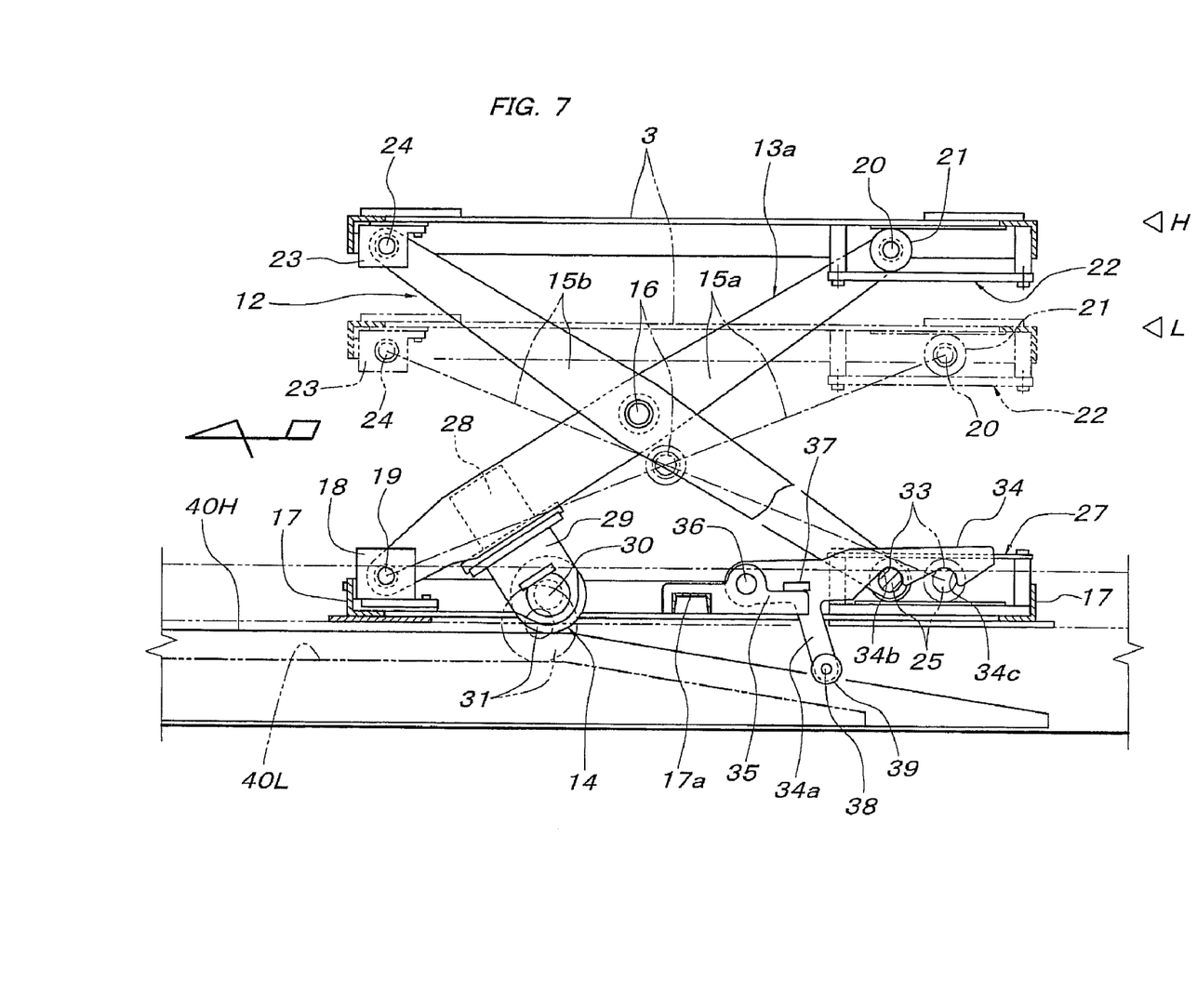
FIG. 7 is a longitudinal sectional rear view showing a crosslink mechanism made to stand up by a cam rail, which is a second embodiment of the present invention.

The height of the lifted position of the to-be-conveyed object support table 3 in the specific section is determined by the thrusting height of the to-be-operated portion 14 (cam follower roller 31) by the cam rail 40, that is, the height of the cam rail 40, however, as shown in FIG. 7, when a specific section where a high cam rail 40H to lift the to-be-conveyed object support table 3 to a high level H has been laid down and a specific section where a low cam rail 40L to lift the to-be-conveyed object support table 3 to a low level L has been laid down are mixed in the conveying route of the conveying traveler 1, it is sufficient to provide concave latching portions 34b that correspond to a position of the common slide fulcrum shaft 25 (to-be-latched portions 33) when the crosslinks 13a and 13b are thrust up by the cam rail 40H and concave latching portions 34c that correspond to a position of the common slide fulcrum shaft 25 (to-be-latched portions 33) when the crosslinks 13a and 13b are thrust up by the cam rail 40L side by side in the back and forth direction.

Figure 8:
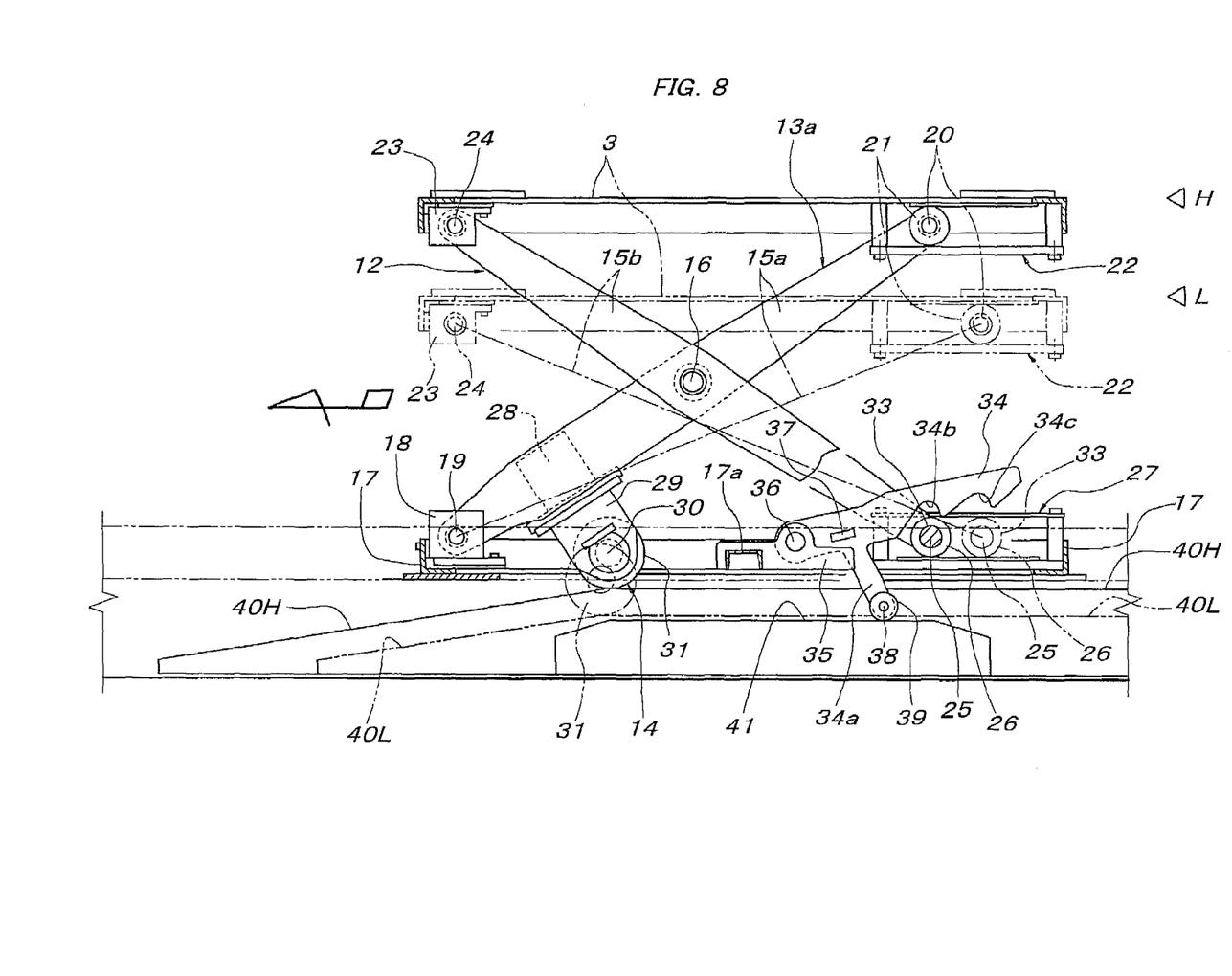
FIG. 8 is a longitudinal sectional side view showing the locking means of the crosslink mechanism being unlocked in the same second embodiment.

According to the configuration, when the to-be-conveyed object support table 3 has been lifted to the high level H by the cam rail 40H, the common slide fulcrum shaft 25 (to-be-latched portions 33) of the crosslinks 13a and 13b is locked by the concave latching portions 34b on the side closer to the spindles 36 of the latches 34, and when the to-be-conveyed object support table 3 has been lifted to the low level L by the cam rail 40L, the common slide fulcrum shaft 25 (to-be-latched portions 33) of the crosslinks 13a and 13b is locked by the concave latching portions 34c on the side distant from the spindles 36 of the latches 34. In addition, in both cases of the specific section with the cam rail 40H and specific section with the cam rail 40L, the unlocking cam 41 is laid down at the end portion as shown in FIG. 8. The unlocking cam 41 has a height to allow working on the cam follower rollers 39 of the latches 34 so as to push up the latches 34 to a height where both of the concave latching portions 34b and 34c leave upward further from a slide route of the common slide fulcrum shaft 25 (to-be-latched portions 33) and a length to allow keeping the same pushed up until the common slide fulcrum 25 (to-be-latched portions 33) that slides rearward leaves rearward further than these concave latching portions 34b and 34c, and can release a lock in a standing condition of the crosslinks 13a and 13b before the to-be-conveyed object support table 3 starts lowering.

In the above-described embodiment, the two front and rear concave latching portions 34b and 34c have been provided in each latch 43, however, a latch only with the concave latching portion 34b to lock the crosslinks 13a and 13b in a standing condition when the to-be-conveyed object support table 3 is lifted to the high level H by the cam rail 40H and a latch only with the concave latching portion 34c to lock the crosslinks 13a and 13b in a standing condition when the to-be-conveyed object support table 3 is lifted to the low level L by the cam rail 40L may be separately provided. In this case, it is necessary to structure the unlocking cam 41 that pushes up at least one latch with the concave latching portion 34b so as to simultaneously push up the other latch with the concave latching portion 34c in order to prevent the common slide fulcrum shaft 25 (to-be-latched portion 33) that slides rearward from the position of the concave latching portions 34b from again being engaged with the concave latching portion 34c of the other latch.

Moreover, in the above-described embodiment, as the to-be-operated portion 14 of the crosslink mechanism 12, the cam follower roller 31 has been provided at a position, of the links 15a and 15b to compose the crosslinks 13a and 13b, close to the position fixing fulcrum shafts 19 of the links 15a having the position fixing fulcrum shafts 19 on the conveying traveler 1 side, however, as shown in FIG. 1A, the to-be-operated portion 14 may be composed of a lifting/lowering rod 42 supported by the conveying traveler body 1 so as to be vertically liftable and lowerable. In this case, at the lower end of the lifting/lowering rod 42, a cam follower roller to work on the cam rail 40 is provided, and at the upper end of the lifting/lowering rod 42, a thrusting table to thrust up the roller supported about an axis on the links 15a side is provided. Accordingly, as a result of the cam rail 40 thrusting up the lifting/lowering rod 42, the lifting/lowering rod 42 makes the crosslinks 13a and 13b stand up via the thrusting table at the upper end thereof and the roller on the links 15a side. A thrusting position on the crosslink side by the lifting/lowering rod 42 may be the position of the common center fulcrum shaft 16 where the links 15a and 15b are mutually pivotally mounted. When the to-be-operated portion 14 formed of such a lifting/lowering rod 42 is employed, since there is a high possibility that the lifting/lowering rod 42 is broken by buckling in a case of a conveying apparatus that handles a major-load to-be-conveyed object, it is particularly effective to use also the locking means 32 in the present invention.

Moreover, as the to-be-latched portions 33 on the crosslinks 13a and 13b side with which the locking latches 34 are engaged, the common slide fulcrum shaft 25 on the conveying traveler body 1 side in the crosslinks 13a and 13b has been used, however, if such a common slide fulcrum shaft 25 does not exist, a member to form the to-be-latched portions 33 with which the locking latches 34 are engaged may be provided, near the slide fulcrum shaft 25, as an annex to the links 15b.

The conveying apparatus with a lifting/lowering to-be-conveyed object support table according to the present invention can be utilized, on an automobile assembly line, as a conveying apparatus that allows conveying a vehicle body (to-be-conveyed object) to which various parts are attached while mounting the same on a to-be-conveyed object support table 3 and keeping, in a section of a parts fitting operation (specific section described in the embodiment where the cam rail 40 has been laid down), the vehicle body (to-be-conveyed object support table 3) lifted to a level where an operator on the conveying traveler body 1 can easily carry out a parts fitting operation.

What is claimed is:

1. A conveying apparatus with a lifting/lowering to-be-conveyed object support table in which a to-be-conveyed object support table (3) is supported on a conveying traveler body (1) so as to be freely liftable and lowerable via a freely erectable crosslink mechanism (12), and a cam rail (40) that selectively moves the to-be-conveyed object support table (3) to a lifted position by working on a to-be-operated portion (14) provided in the crosslink mechanism (12) so as to raise the crosslink mechanism (12) is disposed in a specific section of a conveying route, wherein on a side of the conveying traveler body (1) of the crosslink mechanism (12), a to-be-latched portion (33) that reciprocatingly moves in a roughly horizontal direction as a result of a standing/falling motion of the crosslink mechanism (12) is provided, a locking latch (34) that is automatically latched with the to-be-latched portion (33) when the to-be-conveyed object support table (3) has been lifted to a predetermined position is provided, and an unlocking cam (41) that switches the locking latch (34) to an unlocking posture as a result of traveling of the conveying traveler body (1) at an end portion of the specific section is provided.

2. The conveying apparatus with a lifting/lowering to-be-conveyed object support table according to claim 1, wherein the crosslink mechanism (12) comprises two crosslinks (13a and 13b) provided side by side and being in conjunction with each other, and the to-be-latched portion (33) is composed of a slide fulcrum shaft (25) on the conveying traveler body (1) side hung between the two crosslinks (13a and 13b).

3. The conveying apparatus with a lifting/lowering to-be-conveyed object support table according to claim 1, wherein a plurality of specific sections that are different in height of lifted positions of the to-be-conveyed object support table (3) are provided, and in the locking latch (34), a plurality of latching portions (34b and 34c) are provided in a manner corresponding to the lifted positions of the to-be-conveyed object support table (3) in the respective specific sections.

4. The conveying apparatus with a lifting/lowering to-be-conveyed object support table according to claim 1, wherein links (15a and 15b) of the crosslink mechanism (12) are disposed in a direction parallel to a traveling direction of the conveying traveler body (1), and of the links (15a and 15b), on the link (15a) provided with a position fixing fulcrum shaft (19) on the conveying traveler body (1) side, a cam follower roller (31) is supported about an axis so as to protrude to a downside of the conveying traveler body (1) at a position close to the position fixing fulcrum shaft (19), and the to-be-operated portion (14) is composed of the cam follower roller (31).

5. The conveying apparatus with a lifting/lowering to-be-conveyed object support table according to claim 4, wherein the crosslink mechanism (12) comprises a pair of right and left crosslinks (13a and 13b) being in conjunction with each other, and of the links (15a and 15b) provided two each to compose both links (13a and 13b), the links (15a) provided with position fixing fulcrum shafts (19) on the conveying traveler body (1) side are coupled to each other by a coupling member (28) at a position close to the position fixing fulcrum shafts (19), and the cam follower roller (31) is supported about an axis below the coupling member (28).

6. The conveying apparatus with a lifting/lowering to-be-conveyed object support table according to claim 4, wherein the links (15a and 15b) of the crosslink mechanism (12) are disposed in a direction where position fixing fulcrum shafts (19 and 24) at one end are located forward in the traveling direction of the conveying traveler body (1) relative to slide fulcrum shafts (20 and 25) at the other end.

* * * * *